Nov. 14, 1933.  W. M. RYAN ET AL  1,935,459
CLUTCH
Filed Jan. 15, 1932  2 Sheets-Sheet 1
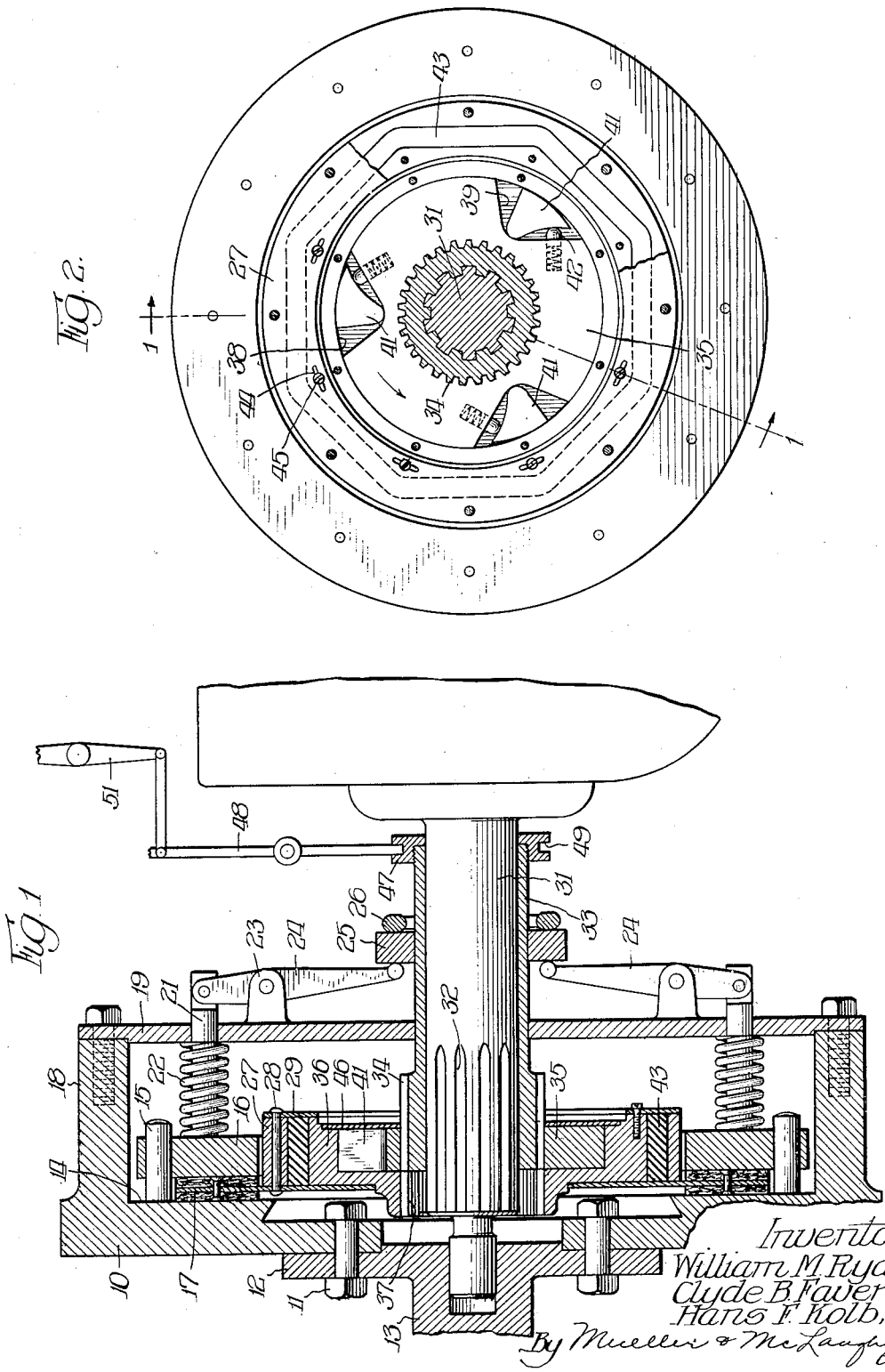
Inventors:
William M. Ryan,
Clyde B. Faverty,
Hans F. Kolb,
By Mueller & McLaughlin
attys.

Nov. 14, 1933.   W. M. RYAN ET AL   1,935,459
CLUTCH
Filed Jan. 15, 1932   2 Sheets-Sheet 2
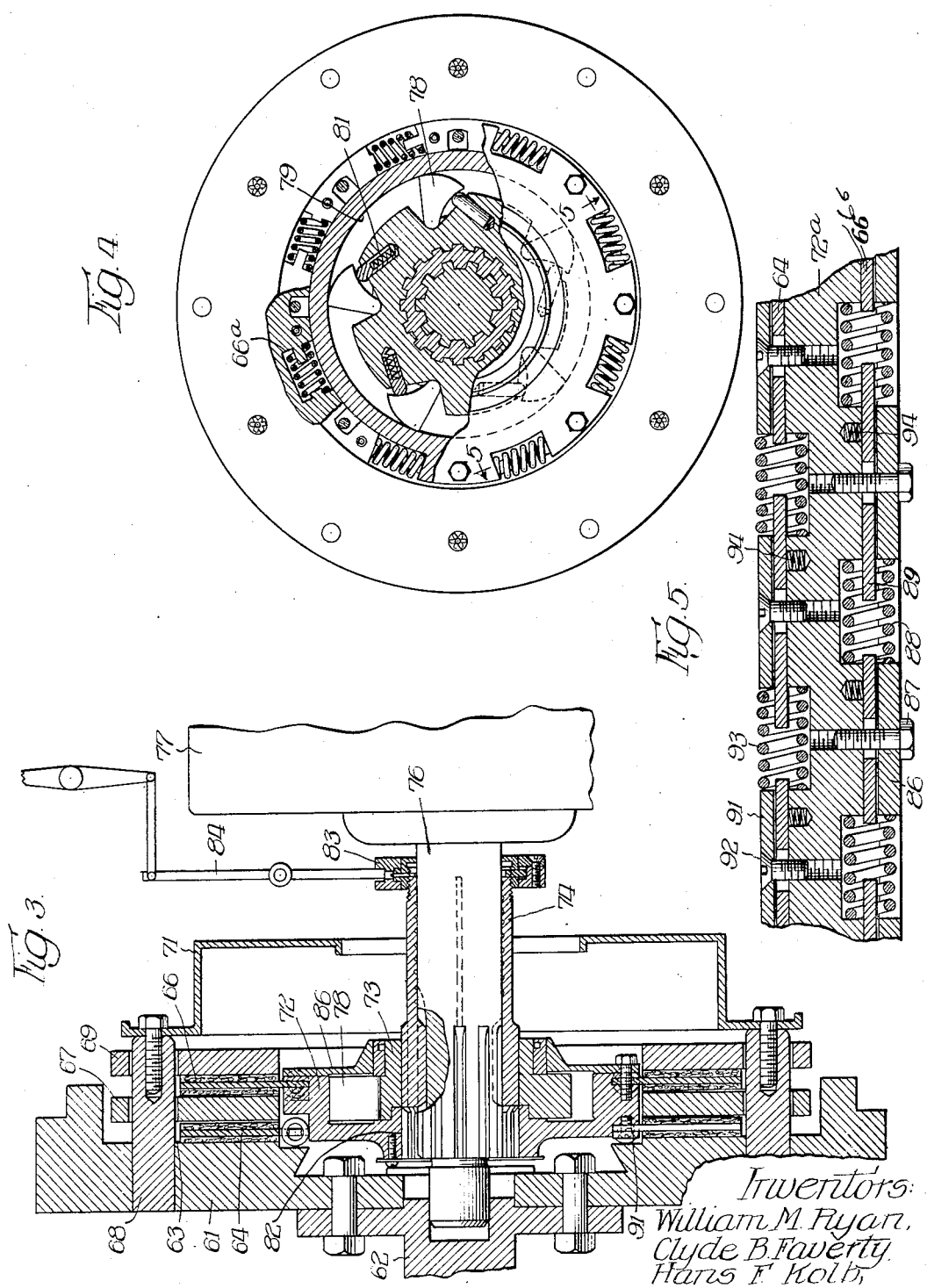

Patented Nov. 14, 1933

1,935,459

UNITED STATES PATENT OFFICE 1,935,459

CLUTCH

William M. Ryan, Clyde B. Faverty, and Hans F. Kolb, Chicago, Ill.; said Ryan and Faverty assignors to said Kolb Application January 15, 1932. Serial No. 586,856

8 Claims. (Cl. 192—48)

Our invention relates to a free wheeling coupling mechanism for shafts of a power driven vehicle and more particularly to a coupling mechanism having torsion dampening means associated therewith.

In the co-pending application of Hans F. Kolb and Claude M. Padgett, Serial No. 533,286, filed April 27, 1931, a novel clutch mechanism employing a free wheeling unit directly in the clutch was illustrated and described. In some forms of overrunning clutches employed in free wheeling devices, it is found that there is a tendency for the overrunning clutch to engage with a jarring action which not only may cause some injury to parts of the overrunning clutch but will transmit the action through to the running parts of the car where it will manifest itself in many undesirable ways. Moreover, when the overrunning clutch is actually engaged and there is a substantially direct connection from the engine through the clutch to the driving wheels, vibration of the motor, particularly at certain speeds, is apt to be transmitted through the driving parts and this also is undesirable.

The principal object of our present invention is to provide torsion dampening means for a free wheeling overrunning type of clutch.

Another object of the invention is to provide a new and improved coupling mechanism for the shafts of power driven vehicles.

A further object is to incorporate a torsion dampening means in an over-running clutch mechanism when incorporated in the standard friction disk or plate clutch.

A further object is to provide a device of this type affording a positive drive, even though the dampening means fails.

Other objects and advantages will appear as the description proceeds.

Referring to the drawings, Fig. 1 is a vertical section of a combination friction and overrunning clutch embodying out invention taken on the line 1—1 of Fig. 2;

Fig. 2 is a transverse sectional view of the apparatus shown in Fig. 1;

Fig. 3 is a vertical, longitudinal central sectional view showing another form which the invention may take;

Fig. 4 is an elevational view of the driven portion of the friction clutch showing the overrunning clutch, the view being partially broken away and shown in section; and Fig. 5 is an enlarged fragmentary sectional view taken along the curved line 5—5 of Fig. 4.

Referring now more in detail to Figs. 1 and 2 of the drawings showing the first embodiment of the invention, we show a fly wheel 10 secured by bolts 11 to a flange 12 carried by a shaft 13 which is the engine crank shaft or an extension thereof. On the inside of the fly wheel is a face 14, which forms a plate of a friction clutch. This plate has a plurality of studs 15 mounted thereon, which pass through apertures in a laterally movable plate or ring 16 which co-operates with plate 14 to clamp a friction disc 17 so as to rotate with the plates 14 and 16. The fly wheel has a laterally extending cylindrical flange 18 to which a cover plate 19 is secured, forming a housing for the clutch mechanism.

In order to move the ring 16 into clamping and unclamping relation to the friction disc 17, the ring is provided with a plurality of standards 21 which extend through cover plate 19. A spring 22 surrounds each of these standards between the cover plate and the ring and the springs serve to urge the ring 16 in a direction to clamp the friction plate 17 between the ring and plate 14.

In order to release the clutch, a plurality of brackets 23 are mounted on the cover plate upon which levers 24 are pivotally mounted. One end of these levers is pivotally connected to a standard 21 and the other end of the levers engaged behind a ring 25 which may be moved by a ring 26 connected to a foot pedal or other operating mechanism not shown. The friction clutch mechanism just described is shown as a single plate clutch. However, it is evident that a larger number of friction plates may be used if desired.

The friction plate 17 has an annulus 27 secured thereto by means of rivets 28 which extend through the annulus and a ring 29. The annulus 27 is provided with a polygonal internal periphery. It is through this annulus that the torque applied to the friction disc 17 is communicated to the clutch for drive shaft 31. This shaft has a plurality of splines 32 adjacent its end and carries a sleeve 33 with cooperating splines so that the sleeve may be moved longitudinally on the shaft, but rotates therewith. The outside of the end of sleeve 33 is also provided with splines 34 and a hub 35 forming part of an over-running clutch has internal splines engaging the external splines on the sleeve, so that the sleeve may move longitudinally with respect to the hub, while the hub rotates with the sleeve. Around the hub 35 is an overrunning clutch housing 36, also provided with internal splines 37 so that it may be coupled to sleeve 33 or not, depending upon the axial position of the sleeve. The clutch housing 36 is provided with a raceway 38 in which the hub 35 rotates. The hub has a plurality of cut out portions 39 of triangular shape, each of which has a rocking pawl in the shape of a triangular block 41 mounted therein so that it will rock or pivot about its apex. These blocks 41 are urged into clutching relation with the raceway by a spring pressed detent 42. The blocks 41 have an increasing radius in a clockwise direction considered from the pivot points of the blocks. This construction causes the hub to move positively with the housing 36 when the housing rotates in a counter clockwise direction as viewed in Fig. 2 until the speed of the hub exceeds the speed of the housing, at which time the hub may freely overrun the housing. The detailed construction of the blocks 41 is more fully set forth in the co-pending application referred to above.

The outer periphery of the overrunning clutch housing 36 is polygonal and corresponds to the inner periphery of annulus 27 except that it is smaller and spaced therefrom. In the space between the annulus 27 and overrunning clutch housing 36 is a resilient member 43 of semi-soft rubber or any other suitable material. This member may be a continuous band surrounding the overrunning clutch housing 36. When a rotational force is applied between the annulus 27 and the overrunning clutch housing 36 the resilient member 43 will yield slightly and thus dampen the torsional deflection or strain in the driving elements. The polygonal shape of the annulus and clutch housing may be such that the angles of the polygon are quite obtuse. For instance, if the outer periphery of the housing and inner periphery of the annulus are made octagonal as shown in the drawings, the angles of the housing will be blunt enough not to cut into the resilient insert. Any sudden torque applied to the crank shaft or driving shaft will tend to cause a deflection or set up a strain in this shaft, but will be dampened by the insert. Since the resistance or reaction to the rotation of the drive or crank shaft is a function of the mass to be accelerated times the acceleration, it will be seen that an abrupt force on the crank shaft would cause an almost infinite reaction. The yielding of the resilient insert is sufficient to prolong the acceleration sufficiently to prevent undue or harmful deflections in the crank shaft.

The plate 17 and ring 29 prevent longitudinal displacement of the resilient insert and at the same time keep the annulus 27 in longitudinal alignment with the housing 36. The housing 36 has a plurality of arcuate slots 44 therein through which pins 45 anchored in ring 29 and plate 17 extend. The length of these slots is the limit of relative movement between the annulus 27 and the housing 36. The housing 36 may be closed by an end plate 46 to retain the blocks 41 therein.

The operation of the apparatus, as shown in Figs. 1 and 2, is as follows: The friction clutch may be used in the conventional manner by moving the ring 26 by means of any suitable lever, this movement being communicated to the ring 25 which is slidably mounted upon the sleeve 33. The overrunning or free wheeling clutch may be selectably used or not, as desired. In the position of the sleeve as shown in Fig. 1, the sleeve is coupled only to the hub 35 of the overrunning clutch, and the clutch is therefore in its free wheeling position. In order positively to couple the housing 36 with the sleeve 33 and shaft 31, sleeve 33 is shifted to the left, as viewed in Fig. 1, causing the splines of the sleeve to engage with the splines 37 of housing 36. It will be noted that the torsion dampening means is effective irrespective of whether the overrunning clutch is utilized for free wheeling or has a positive connection between the friction clutch and shaft 31. In order to shift the sleeve 33 longitudinally on shaft 31, a collar 47 is mounted on the sleeve, and a pivotally mounted lever 48 having a bifurcated end engages in a slot 49 of collar 47. The lever 48 may be moved by any suitable linkage mechanism 51 leading to a position from which it may be controlled by the driver.

Referring now to Figs. 3 to 5, inclusive, we show a fly-wheel 61 secured to a driving shaft 62, which is either the main crank shaft of the engine or an extension thereof. One face 63 of the flywheel is finished to form a driving clutch face and adjacent the driving clutch face is a driven clutch plate 64.

In the present embodiment, we show the invention with a multiple plate clutch. There are two driven plates in all; plate 66 is also a driven plate and an intermediate driving plate 67 is provided, this plate being rotated with the flywheel by means of the inset pins 68. The follower plate 69 engages the outside of the driven plate 66, this follower plate or pressure plate, as it is sometimes called, being forced against the driven clutch plate by springs. In the present embodiment, we do not show the springs, as they are unnecessary to an understanding of the present invention. These springs, however, are disposed between the compression plate 69 and housing 71. A suitable release mechanism, not shown, is also provided, adapted to be operated by the usual clutch pedal.

The driven plates 64 and 66 have a driving connection to an overrunning clutch housing 72. Torsion dampening means is provided between the housing 72 and these driven clutch plates. The more particular description of the torsion dampening means employed in this embodiment will be given hereinafter.

The overrunning clutch of the present embodiment is substantially the same as that described in connection with Figs. 1 and 2. An overrunning clutch hub 73 is splined on a sleeve 74, and this sleeve in turn is splined on a driven shaft 76, which is preferably the main transmission drive shaft extending into the transmission 77. Between the overrunning clutch hub and the overrunning clutch housing, we provide rocking pawls 78, normally forced in a direction to engage a raceway 79 on the inside of the overrunning clutch housing by springs 81. In this form we show five rocking pawls or blocks, although it will be understood that any number of these may be provided.

The overrunning clutch housing has a hub 82 also splined and adapted to drive the sleeve 74 and shaft 76 directly when the sleeve is moved longitudinally on its shaft to engage the housing hub. This movement of the sleeve is accomplished by a suitable mechanism, including a collar 83 and compound lever mechanism 84 by means of which the sleeve may be shifted from a position adjacent the driver's seat.

In the present embodiment, we employ a system of springs for dampening the torsion strains and to secure substantially the same general result which we obtain by means of the live rubber arrangement disclosed in the preceding embodiment.

The overrunning clutch housing has a peripheral extension 72a. On the right hand side of the housing (looking at Fig. 3) there is a cover plate 86 secured thereto by screws 87. This cover plate 86 extends up to and coincides with the outer periphery of the extension 72a. The inner edge of the friction plate 66 is slidably supported between the cover plate 86 and the housing extension 72a. A series of springs 88 are so mounted as to form the driving connection between the friction plate and the housing. The springs are housed in cut away portions of the housing extension 72a and the cover plate 86, and the ends of the springs engage against transverse faces in these members on the cut away portions. The friction plate 66 is also cutaway in the region of the spring, but has tongues 89 which extend within the springs to hold them in place, and a flat portion 66a is formed on the friction plate which also engages the ends of the springs. At each side of the screws 87, the friction plate 66 is cut away to permit a limited movement between the plate and overrunning clutch housing.

With this construction, it will be seen that normally the springs will hold the plate 66 and the housing in the relative position shown in Fig. 5. The plate 66 can move in either direction, however, against the force of the springs 88 and, at the limit of its movements, the springs will always be in position to return the plate to its normal centralized position. Accordingly, torsion in either direction will be dampened, that is to say, whether the vehicle is moving faster than the speed of the engine or vice versa when strain occurs. The friction plate 64 is connected to the overrunning clutch housing in substantially the same manner. Instead of the cover plate, however, a relatively narrow strip 91 is employed secured by screws 92. Springs 93 are supported in position between the members so that the drive between the plate 64 and the overrunning clutch housing is through the torsion dampening springs.

In order to facilitate the separation of the friction plate surfaces when the clutch is released, we provide springs 94 secured in side openings in the overrunning clutch housing extension 72a. These springs are depressed by the movement of the plates when the heavier clutch engaging springs are bearing against the compression plate 69; but when the pressure on the compression plate 69 is relieved, the small springs 94 tend to force the driven friction plates away from the driving clutch surfaces.

The operation in the form of the invention shown on the second sheet of drawings is believed to be clear from the preceding description, as its effect is not dissimilar from that of the overrunning clutch shown in the first two figures.

The combination of the torsional deflection dampening means as embodied in this invention between the frictional clutch and over-running clutch requires practically no additional space and is located in a position where it will be effective irrespective of whether the overrunning clutch is used or not.

It will be understood that the nature and embodiment of the invention herein described and illustrated is merely a convenient and useful form of the invention and that many changes and modifications may be made therein without departing from the spirit and scope of the invention.

What we claim as new and desire to protect by Letters Patent of the United States is:

1. In a power driven vehicle, a friction clutch including a driven plate, an annulus having a polygonal inner periphery secured to said plate, an overrunning clutch housing having a polygonal outer periphery disposed within said annulus but spaced therefrom, a resilient insert in said space forming a yieldable driving connection between said annulus and member, a raceway within said housing, a shaft, and means on said shaft operating in said raceway for positively driving said shaft in one direction.

2. In a power driven vehicle, a splined driven shaft, a sleeve having inner and outer splines slidably mounted on said shaft, a housing and hub of an overrunning clutch each having internal splines, said hub being rotatable with said sleeve and said housing being selectively rotatable therewith, a driving annulus surrounding said housing, and torsion dampening means between said housing and annulus.

3. In a power driven vehicle, a shaft, a sleeve slidable on said shaft and rotatable therewith, a hub and housing of an overrunning clutch, said hub being rotatable with said sleeve and said housing being selectively rotatable therewith, an annulus surrounding said housing, and torsion dampening means connecting said housing and annulus.

4. In a power driven vehicle, a shaft, a sleeve slidable on said shaft, and rotatable therewith, a hub and housing of an overrunning clutch, said hub being rotatable with said sleeve and said housing being selectively rotatable therewith, an annulus surrounding said housing, said housing having a polygonal outer periphery and said annulus having a polygonal inner periphery, and a yieldable member between said peripheries forming a torsion dampening means.

5. In a power driven vehicle, a driven shaft, a sleeve slidable on said shaft and rotatable therewith, a hub and housing of an overrunning clutch, said hub being rotatable with said sleeve and said housing being selectively rotatable therewith, an annulus surrounding said housing, torsion dampening means connecting said housing and annulus, a friction clutch plate secured to said annulus, a driving shaft, and a co-operating friction clutch plate rotatable with said driving shaft.

6. In a power driven vehicle, a driven shaft, a sleeve slidable on said shaft and rotatable therewith, a hub and housing of an overrunning clutch, said hub being rotatable with said sleeve and said housing being selectively rotatable with said sleeve, an annulus surrounding said housing, a rubber insert between the annulus and housing, a friction clutch plate secured to the annulus, a driving shaft and a co-operating friction clutch plate rotatable with said driving shaft.

7. In a power driven vehicle, a splined shaft, a splined sleeve on the shaft, an overrunning clutch hub splined on the sleeve, an overrunning clutch housing, uni-directional clutch elements disposed between the housing and hub, a driven clutch plate, a series of springs disposed about the periphery of the housing and forming a resilient connection with the driven clutch plate, and a driving clutch plate adapted to impart rotary movement to the driven clutch plate.

8. In a power driven vehicle, a driven shaft, a sleeve splined on the shaft, an overrunning clutch hub splined on the sleeve, an overrunning clutch housing having a hub for selective engagement by the sleeve, uni-directional clutch elements disposed between the hub and housing, a driven clutch plate, and a series of springs disposed about the periphery of the overrunning clutch housing and adapted to form a resilient connection with the driven clutch plate.

WILLIAM M. RYAN.
CLYDE B. FAVERTY.
HANS F. KOLB.